US006968382B2

(12) United States Patent
McBrearty et al.

(10) Patent No.: US 6,968,382 B2
(45) Date of Patent: Nov. 22, 2005

(54) ACTIVATING A VOLUME GROUP WITHOUT A QUORUM OF DISKS IN THE VOLUME GROUP BEING ACTIVE

(75) Inventors: Gerald F. McBrearty, Austin, TX (US); Johnny M. H. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 09/903,930

(22) Filed: Jul. 12, 2001

(65) Prior Publication Data

US 2003/0014522 A1    Jan. 16, 2003

(51) Int. Cl.[7] ............................................. G06F 13/00
(52) U.S. Cl. ....................... 709/226; 709/213; 709/229
(58) Field of Search ............................... 709/223–225, 709/226, 227, 229, 213; 345/502; 370/236–238; 395/200

(56) References Cited

U.S. PATENT DOCUMENTS

| 5,495,426 A | * | 2/1996 | Waclawsky et al. | ........ 709/226 |
| 5,629,927 A | * | 5/1997 | Waclawsky et al. | ........ 370/253 |
| 5,675,721 A |   | 10/1997 | Freedman et al. | .......... 345/502 |
| 5,742,587 A | * | 4/1998 | Zornig et al. | ................ 370/235 |
| 5,878,224 A | * | 3/1999 | Smith | ......................... 709/224 |
| 6,067,545 A | * | 5/2000 | Wolff | .......................... 707/10 |
| 6,098,099 A |   | 8/2000 | Ellesson et al. | ............. 709/223 |
| 6,101,541 A |   | 8/2000 | Ellesson et al. | ............. 709/225 |
| 6,154,853 A | * | 11/2000 | Kedem | .......................... 714/6 |
| 6,529,996 B1 | * | 3/2003 | Nguyen et al. | .............. 711/114 |

OTHER PUBLICATIONS

Laurent Vanel et al., "AIX Logical Volume Manager, from A to Z: Introduction and Concepts," *International Technical Support Organization*, Jan. 2000, pp. 1-407.

* cited by examiner

*Primary Examiner*—Viet D. Vu
(74) *Attorney, Agent, or Firm*—Robert A. Voigt, Jr.; Winstead Sechrest & Minick P.C.; Diana L. Roberts-Gerhardt

(57) ABSTRACT

A system, computer program product and method for activating a volume group without a quorum of disks in the volume group being active. A first node, e.g., main server, may send a meta data identifier to a second node, e.g., backup server, upon completion of updating the meta data associated with a plurality of disks in a particular volume group shared by both first and second nodes. If the first node becomes inoperative, e.g., crashes, after sending the meta data identifier to the second node, then the second node may take over the functions of the first node by activating one or more volume groups shared by both the main and backup nodes. The second node may activate a particular volume group by identifying a single disk that is active in that particular volume group based on the meta data identifier associated with that particular volume group.

18 Claims, 4 Drawing Sheets

ACTIVATING A VOLUME GROUP WITHOUT A QUORUM OF DISKS IN THE VOLUME GROUP BEING ACTIVE

TECHNICAL FIELD

The present invention relates to the field of logical volume management of data storage resources in servers, and more particularly to activating a volume group without a quorum of disks in the volume group being active, i.e., possessing valid meta data.

BACKGROUND INFORMATION

A server in a network system may employ a disk storage unit for storing data employed by the server. The disk storage unit may store various types of information such as the operating system under which the micro-processor operates, different application programs that are run by the system and information that is created and manipulated by the various application programs.

The task of allocating disk storage space in the system is generally the responsibility of the operating system, e.g., AIX™, UNIX™. The operating system may logically subdivide the disk storage unit into file systems comprising smaller storage disks. Such systems, in a conventional manner, are employed to store data files, executable programs, and the like. A characteristic of such systems is that it is often difficult to increase the size of a file system after the system is in use and the need for increased size becomes apparent. Nor is it easy to reduce the size of a file system in order to free up data storage space.

These inadequacies may be addressed by the operating system by what is commonly referred to as a Logical Volume Manager (LVM). The LVM may include code incorporated in the operating system kernel that runs above the traditional physical device drivers. The LVM may divide the disk storage space into one or more disks that are commonly referred to as physical volumes (PV's). A physical volume group (PVG) is a named collection of a plurality of physical volumes (PVs), e.g., 128 physical volumes (PVs). The physical volumes (PVs) exclusively owned by a respective physical volume group (PVG) need not be of the same type or size. Each physical volume (PV) within a physical volume group (PVG) has a unique identity within the PVG. The physical volume group (PVG) may provide for portability of physical storage across systems and contains attributes that are common to all objects within the PVG.

Within each physical volume group (PVG), all the constituent physical volumes (PVs) are logically subdivided into physical clusters (PCs) representing a number of equally sized contiguous units of storage space. A physical cluster (PC) may be the smallest unit of disk space allocation, and is a contiguous space on a physical volume (PV).

A logical volume (LV) may be defined by the LVM to be within a physical volume group (PVG) that constitutes a named linear address space comprising an extensible collection of physical clusters (PCs). A logical volume (LV) may exist within only a single physical volume group (PVG) but the physical clusters (PCs) assigned to the LV may come from one or more of the physical volumes (PVs) in the PVG. Hence, the principal function of a logical volume (LV) may be to provide the abstraction of an extensible, reliable disk volume that encompasses logical areas of storage that are larger than individual physical volumes (PVs).

The LVM may further be configured to generate what is commonly referred to as "meta data" for each disk in a physical volume group (PVG). Meta data may be system configuration information that may be used to identify the physical volume group (PVG) associated with the disk as well as the other disks in the physical volume group (PVG) and the logical volumes (LVs) allocated from physical storage locations within the PVG.

A network system may comprise one or more clients, e.g., user's computer, coupled to a host, e.g., server. Clients are the requesting machines, i.e., send requests to the server, and the server is the supplying machine, i.e., supply information to clients. If the server crashes then the clients coupled to the server may no longer have the ability to communicate with the server. Subsequently, a server may have what is commonly referred to as a backup server sharing the same physical volumes (PVs) and physical volume groups (PVGs). If the main server that is coupled to the clients crashes, then the backup server may take over the functions of the main server that crashed. For example, the backup server may take over the application that was running on the main server. In order for the backup server to take over the application that was running on the main server, the backup server must first activate, i.e., start, the shared physical volume groups (PVGs).

A particular shared physical volume group may be activated by a policy of ensuring that all of the disks in that PVG comprise valid meta data. The backup server may determine whether or not the meta data is valid based on an identifier, e.g., time stamp, sent from the main server. Once the particular PVG becomes active, the PVG may remain active as long as all of the disks in that PVG remain active, i.e., possesses valid meta data. Disks may become inactive, i.e., possess invalid meta data, for a variety of reasons such as write errors due to a defective disk. When a disk becomes inactive it may consequently cause the PVG to become deactivated. That is, the PVG may not remain activated since not all of the disks are active.

Subsequently, a new policy was developed that required a quorum, i.e., a majority, of the disks in a PVG to be active, i.e., comprise valid meta data, in order to activate the PVG as well as to maintain activation of the PVG. However, requiring a quorum of disks to activate a PVG is a waste of resources.

It would therefore be desirable to activate a volume group without requiring a quorum of disks in the volume group being active, i.e., possessing valid meta data.

SUMMARY

The problems outlined above may at least in part be solved in some embodiments by a meta data identifier being sent by the main node, e.g., main server, to the backup node, e.g., backup server, upon completion of updating the meta data associated with a plurality of disks in a physical volume group (PVG) shared by both the main and backup nodes. If the main node becomes inoperative after sending the meta data identifier to the backup node, then the backup node may take over the functions of the main node by activating the one or more physical volume groups (PVG) shared by both the main and backup nodes. The backup node may activate a particular physical volume group (PVG) by identifying a single disk out of the plurality of disks in the particular PVG that is active based on the meta data identifier associated with that particular PVG.

In one embodiment of the present invention, a method for activating a volume group without a quorum of disks in the volume group being active may comprise the step of a first node, e.g., main server, sending a first notification to a second node, e.g., backup server, where the first notification indicates that the first node is about to update the meta data associated with a plurality of disks in a particular physical volume group (PVG) shared by both the first and second node. The second node may wait to receive a second notification from the first node indicating that the first node has completed updating the meta data associated with a plurality of disks in a particular PVG. If the first node updates the meta data associated with the plurality of disks in the particular PVG then the first node sends the second notification to the second node. The second notification may include a meta data identifier. If the first node becomes inoperative, e.g., crashes, upon sending the second notification, i.e., upon completing updating the meta data, then the second node may take over the functions of the first node. In order for the second node to take over the functions of the first node, the second node may activate the one or more shared PVGs shared by both the first and second nodes. The second node may activate a particular PVG by identifying a single disk instead of a quorum, i.e., a majority, of disks that is active in the particular PVG based upon the meta data identifier associated with that particular PVG.

In one embodiment of the present invention, the meta data identifier may be a time stamp. The second node may identify the single disk out of the plurality of disks in a particular PVG that is active by matching the time stamp in the meta data identifier associated with that particular PVG with the time stamps in the meta data associated with the disks in that particular PVG. In another embodiment of the present invention, the meta data identifier may include a list of one or more active disks out of the plurality of disks in a particular PVG. The second node may then activate the particular PVG based on one of the one or more disks that were indicated to be active in the meta data identifier.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
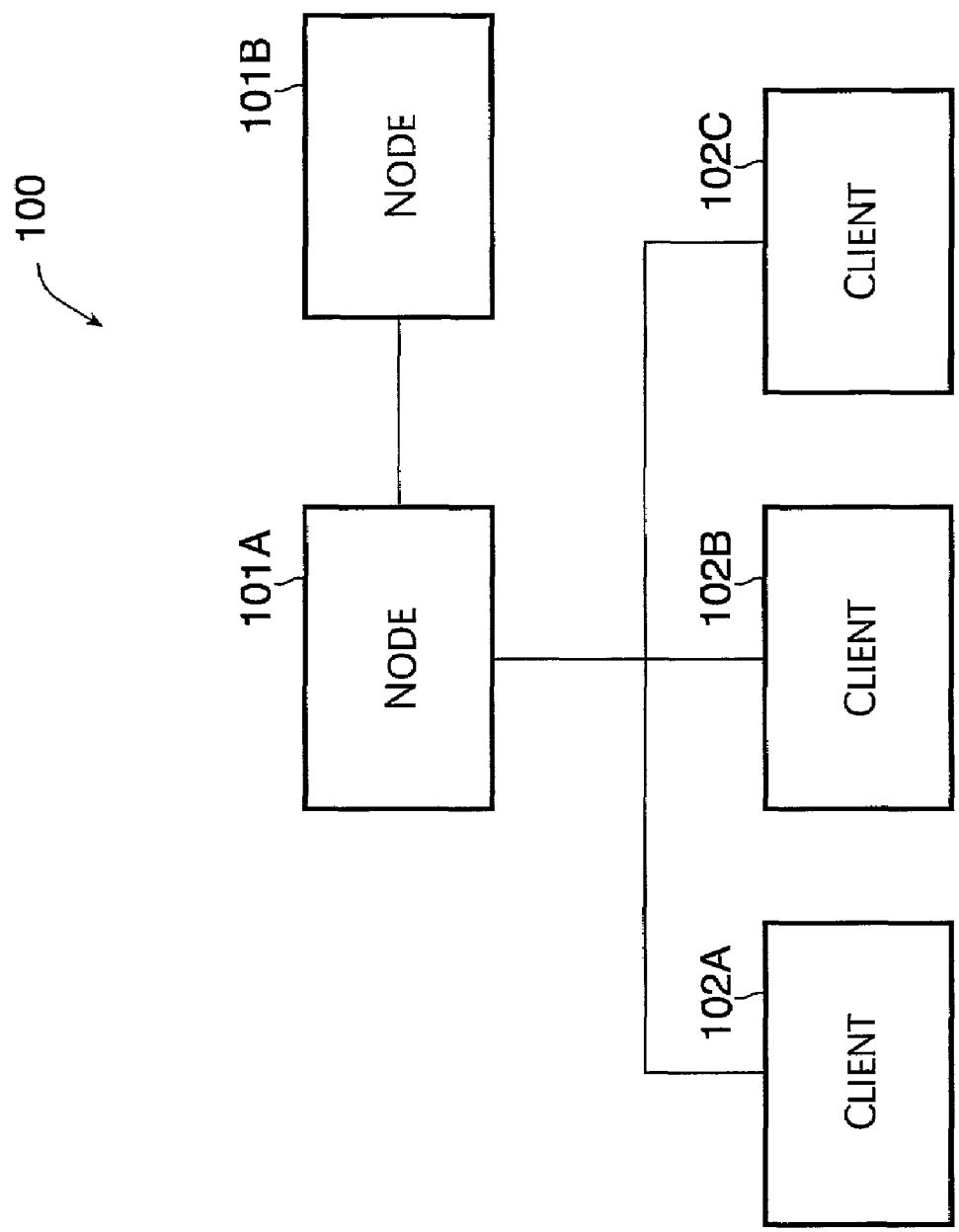
FIG. 1 illustrates an embodiment of a network system configured in accordance with the present invention.

FIG. 1—Network System

FIG. 1 illustrates one embodiment of the present invention of a network system 100. Network system 100 may comprise one or more clients 102A–C coupled to a node 101A, e.g., server. Clients 102A–C may be configured to send requests to node 101A and node 101A may be configured to supply information to the one or more clients 102A–C coupled to node 101A. If node 101A becomes inoperative, e.g., crashes, then a backup node, e.g., node 101B, coupled to node 101A, may take over the functions of node 101A. Clients 102A–C may collectively or individually be referred to as clients 102 or client 102, respectively. Nodes 101A–B may collectively or individually be referred to as nodes 101 or node 101, respectively. It is noted that network system 100 may comprise any number of clients 102 as well as any number of nodes 101, e.g., servers, and that FIG. 1 is illustrative. It is further noted that node 101A may be coupled to more than one backup node 101, e.g., node 101B. It is further noted that the connection between clients 102 and node 101A may be any medium type, e.g., wireless, wired. It is further noted that client 102 may be any type of device, e.g., wireless, Personal Digital Assistant (PDA), cell phone, personal computer system, workstation, Internet appliance, configured with the capability of connecting to the Internet and consequently communicating with node 101A. It is further noted that network system 100 may be any type of system that has at least one node, e.g., server, at least one backup node, e.g., backup server, and at least one client and that FIG. 1 is not to be limited in scope to any one particular embodiment.

FIG. 2—Node

Figure 2:
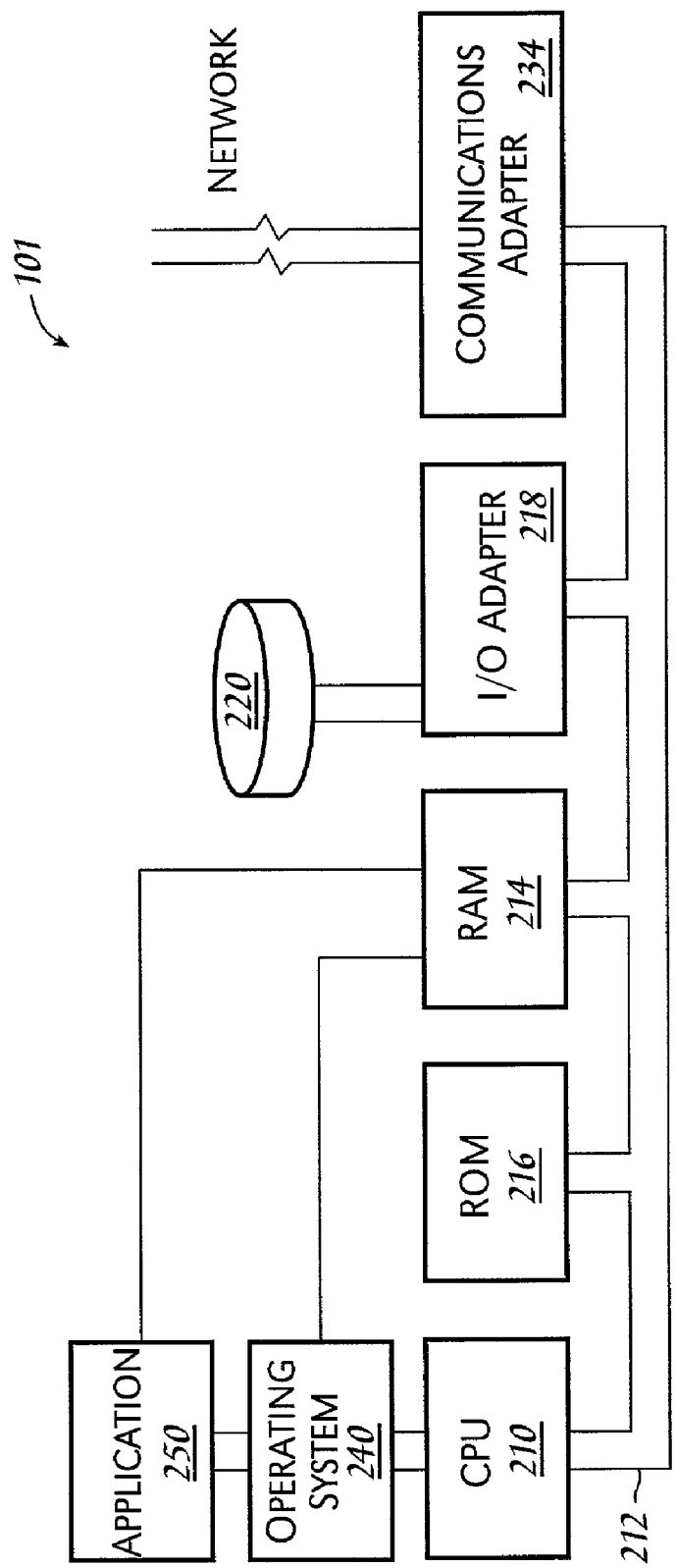
FIG. 2 illustrates an embodiment of a node in the network system configured in accordance with the present invention.

FIG. 2 illustrates an embodiment of the present invention of node 101. Referring to FIG. 2, node 101 may comprise a central processing unit (CPU) 210 coupled to various other components by system bus 212. An operating system 240, e.g., AIX, UNIX, runs on CPU 210 and provides control and coordinates the function of the various components of FIG. 2. Application 250, e.g., program for activating a volume group without a quorum of disks in the volume group being active as described in FIG. 4, runs in conjunction with operating system 240 which implements the various functions to be performed by application 250. Read only memory (ROM) 216 is coupled to system bus 212 and includes a basic input/output system ("BIOS") that controls certain basic functions of server 101. Random access memory (RAM) 214, disk adapter 218 and communications adapter 234 are also coupled to system bus 212. It should be noted that software components including operating system 240 and application 250 are loaded into RAM 214 which is the computer system's main memory. Disk adapter 218 may be a small computer system interface ("SCSI") adapter that communicates with disk storage unit 220. Disk storage unit 220 may be configured to comprise a plurality of disks configured to store data. It is noted that the program of the present invention that activates a volume group without a quorum of disks in the volume group being active as described in FIG. 4, may reside in disk storage unit 220 or in application 250.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by node 101, the set of instructions may be stored as a computer program product in another computer memory, for example, in disk storage unit 220. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
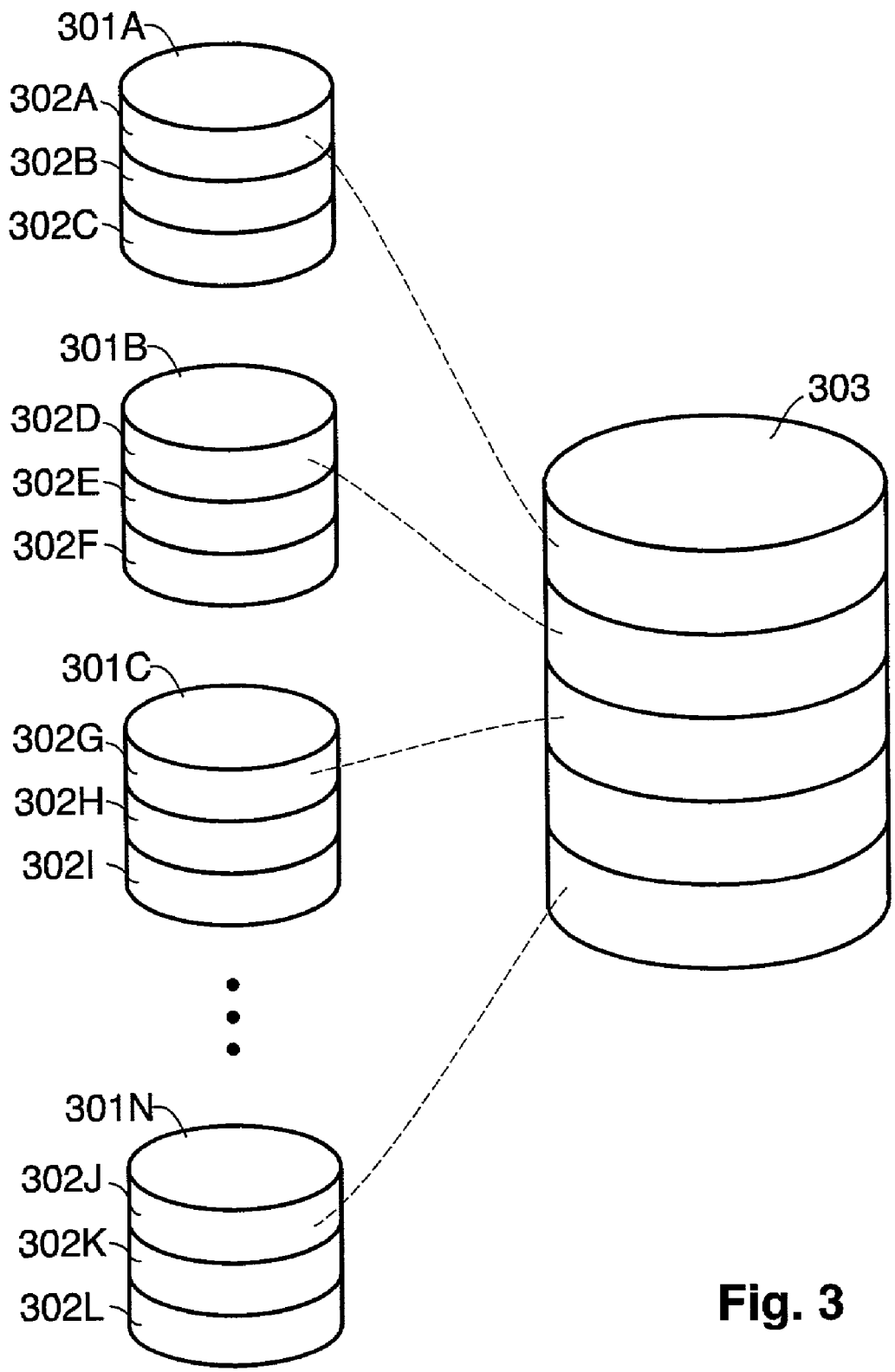
FIG. 3 is a diagram illustrating the mapping of the physical space in the disk storage unit to the logical space.

As stated above, operating system 240 runs on CPU 210 and provides control and coordinates the function of the various components of FIG. 2. A function of operating system 240 may be to logically subdivide the disk storage unit 220 into a plurality of file systems comprising smaller storage disks by a Logical Volume Manager (LVM). The LVM may include code incorporated in the operating system kernel that runs above the traditional physical device drivers. The LVM may divide the disk storage space into logical space as illustrated in FIG. 3. FIG. 3 is a diagram illustrating the mapping of the physical space of the disk storage unit 220 to the logical space. The LVM may divide the disk storage space into one or more disks 301A–N that are commonly referred to as physical volumes (PV's) as illustrated in FIG. 3. Physical volumes 301A–N may collectively or individually be referred to as physical volumes 301 or physical volume 301, respectively. It is noted that LVM may divide the disk storage space into any number of physical volumes 301. A physical volume group (PVG) is a named collection of a plurality of physical volumes (PVs) 301, e.g., physical volumes (PVs) 301A–N. The physical volumes (PVs) 301 exclusively owned by a respective physical volume group (PVG) need not be of the same type or size. Each physical volume (PV) 301 within a physical volume group (PVG) has a unique identity within the PVG. The physical volume group (PVG) may provide for portability of physical storage across systems and contains attributes that are common to all objects within the PVG.

Within each physical volume group (PVG), all the constituent physical volumes (PVs) 301 are logically subdivided into physical clusters (PCs) 302A–L representing a number of equally sized contiguous units of storage space. A physical cluster (PC) may be the smallest unit of disk space allocation, and is a contiguous space on a physical volume (PV) 301. Physical clusters 302A–L may collectively or individually be referred to as physical clusters 302 or physical cluster 302, respectively. It is noted that physical volumes (PVs) 301 may be logically subdivided into any number of physical clusters (PCs) 302. A physical cluster (PC) 302 may be "active" meaning that it contains valid user data. A physical cluster (PC) 302 may be "stale" meaning that it contains outdated user data and needs to be refreshed with updated user data.

A logical volume (LV) 303 may be defined by the LVM to be within a physical volume group (PVG) that constitutes a named linear address space comprising an extensible collection of physical clusters (PCs) 302. A logical volume (LV) may exist within only a single physical volume group (PVG) but the physical clusters (PCs) 302 assigned to the LV may come from one or more of the physical volumes (PVs) 301 in the PVG. Hence, the principal function of a logical volume (LV) may be to provide the abstraction of an extensible, reliable disk volume that encompasses logical areas of storage that are larger than individual physical volumes (PVs).

The LVM may further be configured to generate what is commonly referred to as "meta data" for each disk 301 in the physical volume group (PVG). Meta data may be system configuration information that may be used to identify the physical volume group (PVG) associated with the disk 301 as well as the other disks 301 in the physical volume group (PVG) and the logical volumes (LVs) 303 allocated from physical storage locations within the PVG. In one embodiment, meta data associated with each disk 301 may be stored at the beginning of each disk 301 in the physical volume group (PVG).

Referring to FIGS. 1–3, backup node 101B may share the same one or more physical volumes (PVs) 301 and physical volume groups (PVGs) as main node 101A. As stated above, when main node 101A becomes inoperative, e.g., crashes, backup node 101B may take over the functions of main node 101A. In order for backup node 101B to take over the functions of main node 101A, backup node 101B must activate the shared one or more physical volume groups (PVGs). As stated in the Background Information section, a particular physical volume group (PVG) may be activated by backup node 101B by requiring a quorum, i.e., a majority, of disks 301 in that particular PVG to comprise valid meta data, i.e., the most recent version of meta data. It would therefore be desirable to activate a shared physical volume group (PVG) without requiring a quorum of disks in that PVG to be active, i.e., possess valid meta data. A method for a physical volume group (PVG) without requiring a quorum of disks in that PVG to be active is described below.

Figure 4:
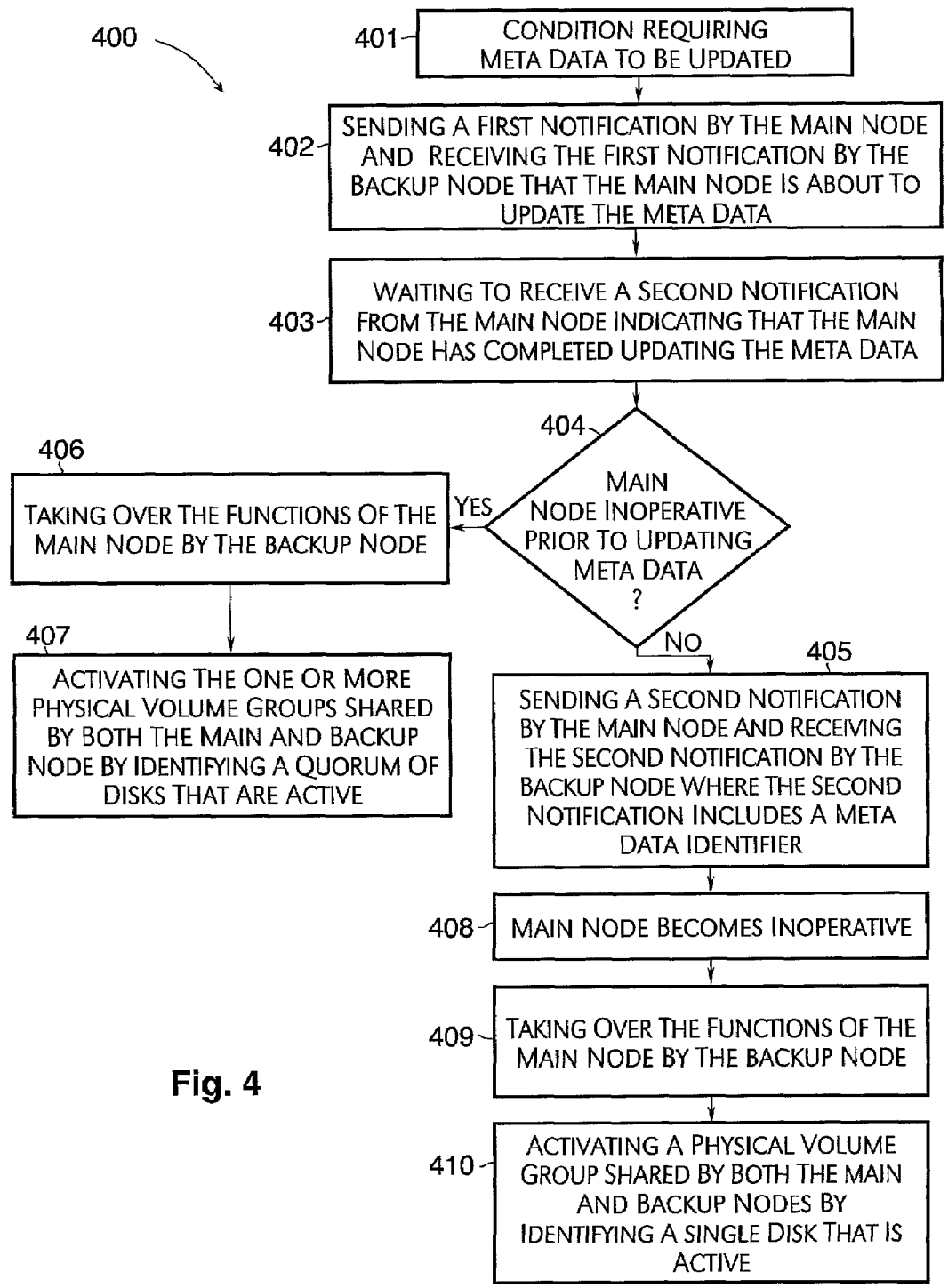
FIG. 4 is a flowchart of a method for activating a volume group without a quorum of disks in the volume group being active.

FIG. 4—Method for Activating a Volume Group without a Quorum of Disks in the Volume Group being Active FIG. 4 is a flowchart of one embodiment of the present invention of a method 400 for activating a physical volume group (PVG) without a quorum of disks in that PVG being active.

In step 401, main node 101A, e.g., server, coupled to one or more clients 102 may change the allocation of a physical volume group (PVC), e.g., change which disks 301 are part of a physical volume group (PVG), or the physical clusters (PCs) may change state, e.g., active or stale. As stated above, meta data associated with each disk 301 in a particular physical volume group (PVG) may comprise system configuration information that may be used to identify the physical volume group (PVG) associated with the disk 301 as well as the other disks 301 in the physical volume group (PVG) and the logical volumes (LVs) 303 allocated from physical storage locations within the PVG. Consequently, meta data may have to be updated by main node 101A when main node 101A, e.g., server, changes the allocation of a physical volume group (PVG), e.g., change which disks 301 are part of a physical volume group (PVG), or when the physical clusters (PCs) change state, e.g., active or stale.

In step 402, main node 101A may send a first notification to backup node 101B and backup node 100B may receive the first notification where the first notification indicates that main node 101A is about to update the meta data associated with the plurality of disks 301 in a particular physical volume group (PVG).

In step 403, backup node 101B waits to receive a second notification from main node 101A indicating that main node 101A has completed updating the meta data associated with the plurality of disks 301 in a particular physical volume group PVG.

In step 404, a determination may be made as to whether or not main node 101A became inoperative, e.g., crashed, prior to updating the meta data associated with the plurality of disks 301 in a particular physical volume group (PVG). If main node 101A does not become inoperative, e.g., crash, prior to updating the meta data associated with the plurality of disks 301 in a particular physical volume group (PVG), then main node 101A sends the second notification and backup node 101B receives the second notification where the second notification includes a meta data identifier, e.g., time stamp, list of one or more disks 301 associated with the particular PVG that are active, in step 405.

If main node 101A becomes inoperative, i.e., crashes, prior to updating the meta data associated with disks 301 in a particular physical volume group (PVG), then backup node 101B takes over the functions of main node 101A in step 406. In order to take over the functions of main node 101A, backup node 101B must activate, i.e., start, one or more physical volume groups (PVGs) shared by both main node 101A and backup node 101B. It is noted that backup node 101B may be notified that main node 101A became inoperative, e.g., crashed, by an assortment of methods such as an interrupt executed by a higher level software. It is further noted that other methods of notification would be recognized by an artisan of ordinary skill in the art and that such embodiments employing such methods would fall within the scope of the present invention.

In step 407, backup node 101B may activate, i.e., start, each of the one or more physical volume groups (PVGs) shared by both main node 101A and backup node 101B by backup node 101B identifying a quorum, i.e., a majority, of disks 301 in each physical volume group (PVG) that are active, i.e., possess valid meta data. Backup node 101B may activate a physical volume group (PVGs) shared by both main node 101A and backup node 101B by identifying a quorum of disks 301 that are valid in the physical volume group (PVG) since backup node 101B did not receive the second notification indicating that main node 101A has completed updating the meta data associated with each disk 301 in the PVG.

Referring to step 405, upon receiving the second notification main node 101A becomes inoperative, e.g., crashes, in step 408. Upon main node 101A becoming inoperative, e.g., crashes, backup node 101B takes over the functions of main node 101A in step 409. In order to take over the functions of main node 101A, backup node 101B must activate, i.e., start, one or more physical volume groups (PVGs) shared by both main node 101A and backup node 101B.

In step 410, a physical volume group (PVG) shared by both main node 101A and backup node 101B may be activated by backup node 101B based on backup node 101B identifying a single disk 301 out of the plurality of disks 301 in the physical volume group (PVG) that is active, i.e., meta data associated with the single disk 301 is valid. The single disk 301 may be identified based on the meta data identifier, e.g., time stamp, list of one or more active disks 301 in the PVG, received in the second notification in step 405. It is noted that the meta data identifier may comprise other forms of information used to identify active disks and that the above examples are illustrative. In one embodiment, backup node 101B may identify a single disk 301 out of the plurality of disks 301 in a particular physical volume group (PVG) that is active by matching the time stamp in the meta data identifier with the time stamps in the meta data associated with the plurality of disks 301 in the particular PVG. If there is a match, the particular disk 301 associated with the matched time stamp may be said to be active, i.e., possesses valid meta data. In another embodiment, backup node 101B may receive a list of one or more disks 301 out of the plurality of disks 301 in the PVG that are valid, i.e., possess valid meta data, in the meta data identifier. Backup node 101B may then activate a physical volume groups (PVG) shared by both main node 101A and backup node 101B based on one of the one or more disks that are active. It is noted that each of the one or more PVGs shared by both main node 101A and backup node 101B may be activated by identifying a single disk that is active in each PVG if backup node 101B received the notification that main node 101A updated the meta data associated with the plurality of disks 301 in each PVG prior to main node 101A becoming inoperative. If backup node 101B did not receive notification that main node 101A updated the meta data associated with the plurality of disks 301 in any PVG prior to main node 101A becoming inoperative, then backup node 101B may active those PVGs by identifying a quorum, i.e., a majority, of disks 301 in each of those PVGs that are active as in step 407.

It is noted that method 400 may be executed in a different order presented and that the order presented in the discussion of FIG. 4 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for activating a volume group, in a network system of a plurality of nodes, without a quorum of disks in said volume group being active comprising the steps of:
   receiving from a first node by a second node a first notification of updating meta data associated with a plurality of disks in a first volume group shared by said first node and said second node;
   receiving from said first node a second notification by said second node indicating that said meta data associated with said plurality of disks in said first volume group has been updated, wherein said second notification comprises a data identifier; and
   activating by said second node said first volume group by identifying a single disk with valid meta data out of said plurality of disks in said first volume group based on said data identifier, wherein said data identifier identifies one or more disks that are active.

2. The method as recited in claim 1, wherein said step of activating said first volume group shared by said first and said second node occurs after said first node becomes inoperative, wherein said first node becomes inoperative after sending said second notification.

3. The method as recited in claim 1, wherein said meta data is system configuration information used to identify said first volume group.

4. The method as recited in claim 1, wherein said data identifier comprises a first time stamp, wherein said activating step comprises the following steps:
   searching by said second node a plurality of time stamps in said meta data associated with said plurality of disks in said first volume group, wherein said meta data is generated by a logical volume manager, wherein each of said plurality of time stamps in said meta data is associated with an identifier in said meta data that identifies one of said plurality of disks in said first volume group;
   matching said first time stamp with a second time stamp in said plurality of time stamps in said meta data associated with said plurality of disks in said first volume group; and in response to said matching, identifying said single disk by said second node by matching said first time stamp with said second time stamp associated with an identifier that identifies said single disk.

5. The method as recited in claim 1, wherein said data identifier comprises a list of one or more active disks in said first volume group, wherein said activating step comprises the following steps:
reading said list of one or more active disks in said first volume group by said second node, wherein said list includes a listing of said single disk; and
in response to said reading, identifying said single disk listed in said list of one or more active disks in said first volume group.

6. The method as recited in claim 1 further comprising the steps of:
determining by said first node that an allocation of disks in said first volume group needs to be changed;
changing which disks are part of said first volume group by said first node; and
in response to changing which disks are part of said first volume group, updating by said first node said meta data associated with said plurality of disks in said first volume group.

7. A computer program product having computer readable memory having computer program logic recorded thereon for activating a volume group, in a network system of a plurality of nodes, without a quorum of disks in said volume group being active, comprising:
programming operable for receiving from a first node by a second node a first notification of updating meta data associated with a plurality of disks in a first volume group shared by said first node and said second node;
programming operable for receiving from said first node a second notification by said second node indicating that said meta data associated with said plurality of disks in said first volume group has been updated, wherein said second notification comprises a data identifier; and
programming operable for activating by said second node said first volume group by identifying a single disk with valid meta data out of said plurality of disks in said first volume group based on said data identifier, wherein said data identifier identifies one or more disks that are active.

8. The computer program product as recited in claim 7, wherein said programming step of activating said first volume group shared by said first and said second node occurs after said first node becomes inoperative, wherein said first node becomes inoperative after sending said second notification.

9. The computer program product as recited in claim 7, wherein said meta data is system configuration information used to identify said first volume group.

10. The computer program product as recited in claim 7, wherein said data identifier comprises a first time stamp, wherein said activating programming step comprises the following programming steps:
searching a plurality of time stamps in said meta data associated with said plurality of disks in said first volume group, wherein said meta data is generated by a logical volume manager, wherein each of said plurality of time stamps in said meta data is associated with an identifier in said meta data that identifies one of said plurality of disks in said first volume group;
matching said first time stamp with a second time stamp in said plurality of time stamps in said meta data associated with said plurality of disks in said first volume group; and
in response to said matching, identifying said single disk by matching said first time stamp with said second time stamp associated with an identifier that identifies said single disk.

11. The computer program product as recited in claim 7, wherein said data identifier comprises a list of one or more active disks in said first volume group, wherein said activating programming step comprises the following programming steps:
reading said list of one or more active disks in said first volume group, wherein said list includes a listing of said single disk; and
in response to said reading, identifying said single disk listed in said list of one or more active disks in said first volume group.

12. The computer program product as recited in claim 7 further comprising:
programming operable for determining that an allocation of disks in said first volume group needs to be changed:
changing which disks are part of said first volume group by said first node; and
in response to changing which disks are part of said first volume group, updating said meta data associated with said plurality of disks in said first volume group.

13. A system, comprising:
a first node; and
a second node coupled to said first node, wherein said second node is configured to take over the functions of said first node if said first node becomes inoperative, wherein said second node comprises:
a processor;
a memory unit operable for storing a computer program operable for activating a volume group without a quorum of disks in said volume group being active;
an input mechanism;
an output mechanism; and
a bus system coupling the processor to the memory unit, input mechanism, and output mechanism, wherein the computer program is operable for performing the following programming steps:
receiving a first notification of updating meta data associated with a plurality of disks in a first volume group shared by said first node and said second node;
receiving a second notification indicating that said meta data associated with said plurality of disks in said first volume group has been updated, wherein said second notification comprises a data identifier; and
activating said first volume group by identifying a single disk with valid meta data out of said plurality of disks in said first volume group based on said data identifier, wherein said data identifier identifies one or more disks that are active.

14. The system as recited in claim 13, wherein said programming step of activating said first volume group shared by said first and said second node occurs after said first node becomes inoperative, wherein said first node becomes inoperative after sending said second notification.

15. The system as recited in claim 13, wherein said meta data is system configuration information used to identify said first volume group.

16. The system as recited in claim 13, wherein said data identifier comprises a first time stamp, wherein said activating programming step comprises the following programming steps:
   searching a plurality of time stamps in said meta data associated with said plurality of disks in said first volume group, wherein said meta data is generated by a logical volume manager, wherein each of said plurality of time stamps in said meta data is associated with an identifier in said meta data that identifies one of said plurality of disks in said first volume group;
   matching said first time stamp with a second time stamp in said plurality of time stamps in said meta data associated with said plurality of disks in said first volume group; and
   in response to said matching, identifying said single disk by matching said first time stamp with said second time stamp associated with an identifier that identifies said single disk.

17. The system as recited in claim 13, wherein said data identifier comprises a list of one or more active disks in said first volume group, wherein said activating programming step comprises the following programming steps:
   reading said list of one or more active disks in said first volume group, wherein said list includes a listing of said single disk; and
   in response to said reading, identifying said single disk listed in said list of one or more active disks in said first volume group.

18. The system as recited in claim 13, wherein said meta data associated with said plurality of disks in said first volume group is updated if the allocation of said first volume group shared by said first and said second node needs to be changed.

* * * * *